Nov. 6, 1928.

G. W. ELSEY 1,690,336

MACHINE FOR BENDING ARMATURE CONDUCTORS

Filed Dec. 22, 1925    7 Sheets-Sheet 3

Inventor
George W. Elsey
By Spencer Small & Hardman
his Attorneys

Patented Nov. 6, 1928.

1,690,336

UNITED STATES PATENT OFFICE.

GEORGE W. ELSEY, OF ANDERSON, INDIANA, ASSIGNOR, BY MESNE ASSIGNMENTS, TO DELCO-REMY CORPORATION, OF DAYTON, OHIO, A CORPORATION OF DELAWARE.

MACHINE FOR BENDING ARMATURE CONDUCTORS.

Application filed December 22, 1925. Serial No. 76,974.

This invention relates to the manufacture of armatures for dynamo electric machines and more particularly to armatures having bar windings such as the armatures or series motors used for starting internal-combustion engines. In the manufacture of bar-wound armatures it has been the practice to provide single turn bar windings commonly known as "hairpins" having parallel branches which are placed in spaced slots on the armature core by moving the hairpin endwise through the slots. Each slot of the armature core will contain a portion of one hairpin and a portion of another hairpin, one portion being located nearer the periphery of the core than the other. All of the hairpin conductors are assembled upon the armature core and the ends of these conductors which project beyond one side of the core are displaced angularly from the slots from which the conductors emerge so that the ends of the branches of the hairpins will be located respectively in alignment with certain risers of a commutator through which the ends of the branches are respectively connected in order to make the proper connections between the commutator and the armature windings. The inner circular row of armature leads are then angularly displaced in one direction relative to the armature shaft, and the conductor leads which are in the outer circular row are displaced in the opposite direction.

One of the objects of the present invention is to facilitate the work of bending the armature conductor leads in order to reduce the cost of this part of the manufacture of the armature. In order to accomplish this object, the present invention provides a machine comprising bending members which are rotated in opposite directions and are adapted to receive, respectively, the armature leads which are located in the outer circular row and the inner circular row, a work holder for receiving an armature to be operated upon, devices engageable with the conductors adjacent the core for limiting the abruptness of the bending of the armature conductor leads when they emerge from the core and a control apparatus having a single manually operable member which, when moved in a certain position, will automatically cause the work holder to advance toward the bending members, said conductor engaging devices to advance toward the conductors automatically, the bending members then to be rotated in opposite directions so that the conductor leads will be angularly displaced, said device then to be retracted from the work, and the work holder and an armature then to be retracted from the bending members and the bending members to be returned to normal position ready for operation upon another armature.

A further object of the invention is to provide a machine of the type described which is adapted to be attached to the horizontal bed of a conventional type of punch press, and having mechanism for operating the bending members constructed and arranged to be operated by the vertically reciprocating head of the punch press.

Further objects and advantages of the present invention will be apparent from the following description, reference being had to the accompanying drawings wherein a preferred form of embodiment of the present invention is clearly shown.

Figure 1:
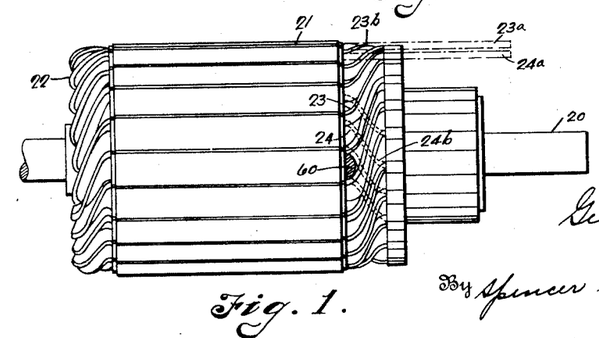
Fig. 1 is a side view of an armature which is manufactured with the aid of the machine embodying the present invention.

Referring to Fig. 1 which shows the type of armature to which the present invention pertains, 20 designates the armature shaft, 21 the core, and 22 one of the hairpin or single turn bar conductors. Each slot of the armature core contains branch 23 of one conductor and branch 24 of another conductor. As indicated by the dot and dash lines of Fig. 1, conductors usually emerge in parallelism from the core 21. The outer conductors 23 are located in an outer circular row and the conductors 24 in an inner circular row. The function of the machine which is about to be described is to bend the ends of the outer row of conductor leads 23 into the positions indicated in full lines in Fig. 1 and designated by the numeral 23$^b$; and to bend the inner row of conductor leads into the positions shown in dotted lines and designated by the numeral 24$^b$.

As stated before, the machine comprises a bending mechanism for receiving the ends of the armature conductor leads and for bending them away from the radial planes of the core slots from which these conductors emerge; devices for engaging the conductor leads to limit the abruptness of curvature thereof when the leads emerge from the core; a work handling device; and a control mechanism which is set in motion by the operation of a manually movable member and which functions to effect the operation of these mechanisms in a predetermined sequence. These principal parts of the machine will be described in the order mentioned.

Bending mechanism.

Figures 5, 6, 7, 8:
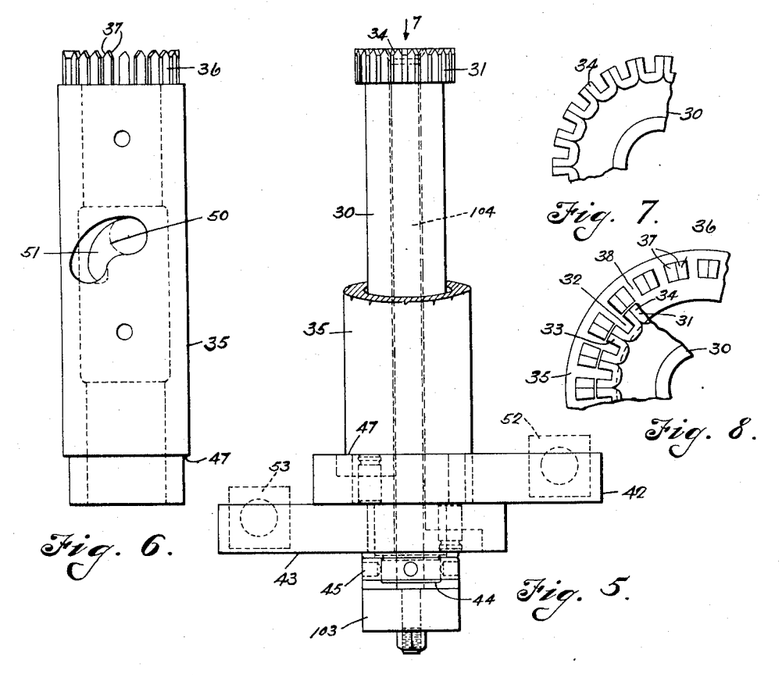
Fig. 5 is a plan view of the bending members one of which has been broken away for sake of clearness.
Fig. 6 is a plan view of the outer bending member.
Fig. 7 is a fragmentary end view of the inner bending member looking in the direction of arrow 7 of Fig. 5.
Fig. 8 is a fragmentary end view looking in the same direction as the end view shown in Fig. 7, but showing the relation between both of the bending members.

Referring first to Fig. 5 the bending mechanism comprises a tubular member 30 having a flange 31 provided with a plurality of radial notches 32 which define a plurality of radial extending fingers 33 which are beveled as indicated by numeral 34 in Figs. 8 and 5. Each notch 32 is intended to receive the end of one of the conductor leads which is located in the inner circular row referred to, for example, one of the conductor leads 24$^a$ shown in Fig. 1. A tubular bending member 35 surrounds the member 30 and is provided with a plurality of spaced tines 36 which are beveled at 37 as clearly shown in Figs. 6 and 8. Each space 38 between the adjacent tines 36 is intended to receive an end of the conductor leads in the outer row of conductors, for example, one of the conductor leads 23$^a$ shown in Fig. 1.

The bending member 35 is mounted for rotation in bearing 40 which is supported by frame 41 of the machine. This frame is adapted to be supported by the die-supporting bed of a conventional punch press having a vertically reciprocating head to which a punch may be attached. The tubular member 35 provides a bearing for the inner bending member 30. The flange 31 of the member 30 overlies the adjacent end of the member 35 so that relative movement between these members is prevented in one direction. A lever 42 is attached to the member 35, and a lever 43 to the member 30. The right hand end of the member 30 is provided with a threaded portion 44 for receiving a nut 45 which clamps the lever 43 against a shoulder 46 provided by the member 30. Thus the lever 42 is confined between a shoulder 47 provided by the member 35 and the lever 43. It is therefore apparent that endwise movement of the member 35 will produce endwise movement of the member 30 in either direction. Endwise movement of the members 30 and 35 is produced in response to the rotation of member 35 by means which includes a pin 50 threadedly engaging the frame 41 and extending through a hole in the bearing 40 and into a spiral slot 51 provided in the member 35 as shown in Fig. 6. The relation of the cam slot to the pin is indicated in Fig. 6, the circle in dot and dash lines representing the pin 50. It is therefore obvious that if the member 35 be turned in a counterclockwise direction as viewed in Fig. 2 or as viewed from the left of Fig. 3, both bending members will approach the armature core. This feature is necessary since the distance between the ends of the armature conductors and the core diminishes as the extent of angular displacement of the conductor ends increases.

The levers 42 and 43 are engaged by blocks 52 and 53, respectively, which are carried by a yoke 54 attached to a shank 55 which is adapted to be attached to the head of a punch press of the type referred to. Obviously, downward movement of the punch press head will cause said levers to move downwardly and the members 35 and 30 to be rotated counterclockwise and clockwise, respectively, as viewed in Fig. 1 and in the direction of the arrow 51ª as viewed in Fig. 3. When the punch press head moves upwardly the levers 42 and 43 are returned to normal position by springs 56 and 57, respectively, which are connected respectively with said levers and with stationary studs 58 and 59, respectively.

A ring 48 surrounds tines 36 of the member 35 and a ring 49 separates said tines from the fingers 31 of the member 30.

Conductor engaging devices.

Figure 9:
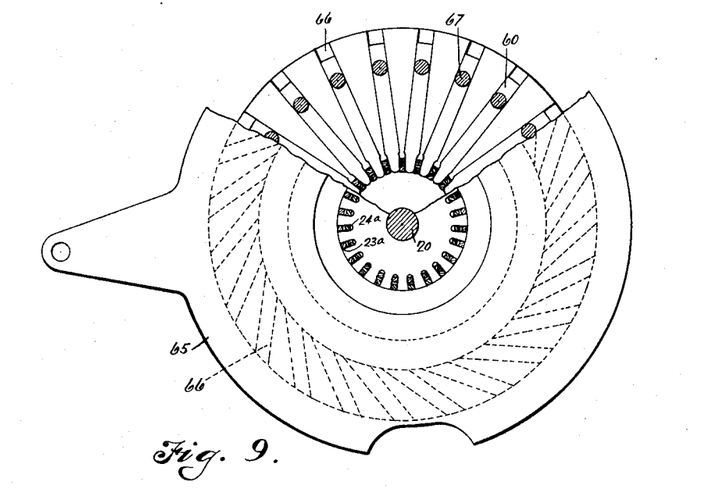
Fig. 9 is a fragmentary view partly in section showing the forming slides in engagement with the conductors.
Figure 10:
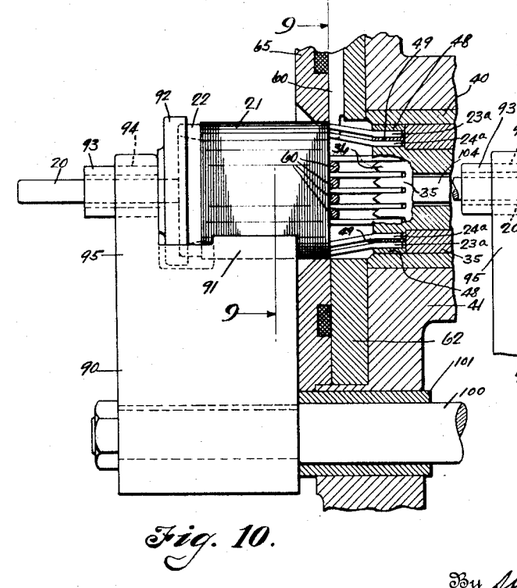
Fig. 10 is a fragmentary longitudinal sectional view of the bending devices and forming slides prior to the bending operation.
Figure 11:
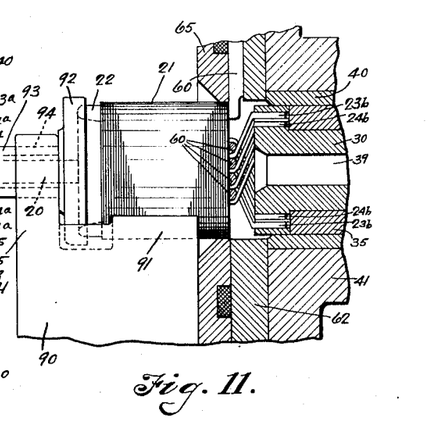
Fig. 11 is a view similar to Fig. 10 showing the position of the bending members after the bending operation and prior to the disengagement of the armature from the bending members.

The devices which are engaged by the armature conductor leads while being bent to limit the abruptness of curvature of the leads adjacent the core 21 comprise a plurality of sliding bars 60 each received by a radially extending groove 61 provided by a circular guide block 62 which is located within a cylindrical recess 63 provided by the frame 41. A dowel pin 64 maintains the guide block 62 in a desired position angularly relative to the bending members. The slides 60 are actuated by a rotatable cam plate 65 having a plurality of oblique slots 66 each for receiving a pin 67 attached to one of the slides 60. The cam plate 65 is provided with a journal 68 which is received within the recess 63, the cylindrical wall of which provides a bearing for the journal 68. The plate 65 is retained by screws 69 threadedly engaging the frame 41 and extending through slots 70 which provide for movement of the plate 65 relative to the frame. When the plate 65 is in the position shown in Figs. 2 and 3, the slides will be retracted to the greatest extent from the axis of the armature so as to permit the armature conductor leads 23ª and 24ª to be introduced through the central apertures 71 and 72 provided by the plate 65 and the block 62, so that these leads may be received by the recesses 38 and 32 provided by the bending members as shown in Fig. 8. When the plate 65 is rotated counterclockwise from the position shown in Fig. 2 to the position shown in Fig. 9, the slides will be moved inwardly between the conductor leads to provide curved forms (shown more clearly in Figs. 1, 10 and 11) about which the leads are bent. These slides prevent bending the leads so sharply as to injure the core insulation, which injury might result in grounding a conductor. Before the armature is retracted from the bending members as shown in Fig. 11, the slides 60 are retracted by movement of the plate 65 in a clockwise direction as viewed in Figs. 2 and 9.

Figure 2:
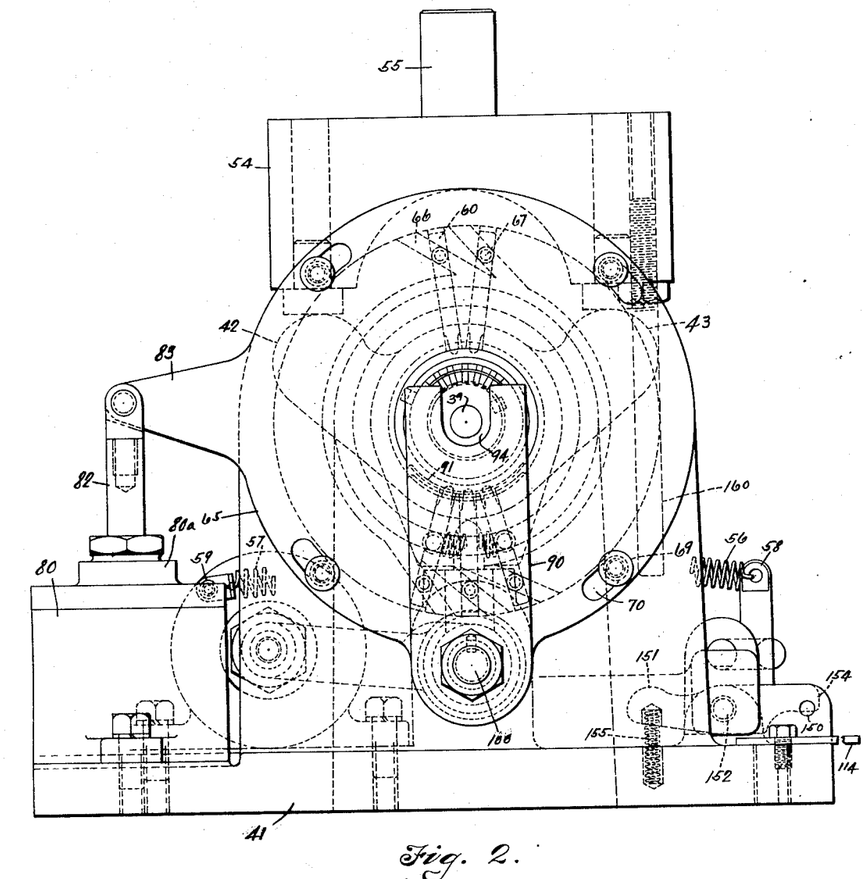
Fig. 2 is an end view of said machine.
Figure 3:
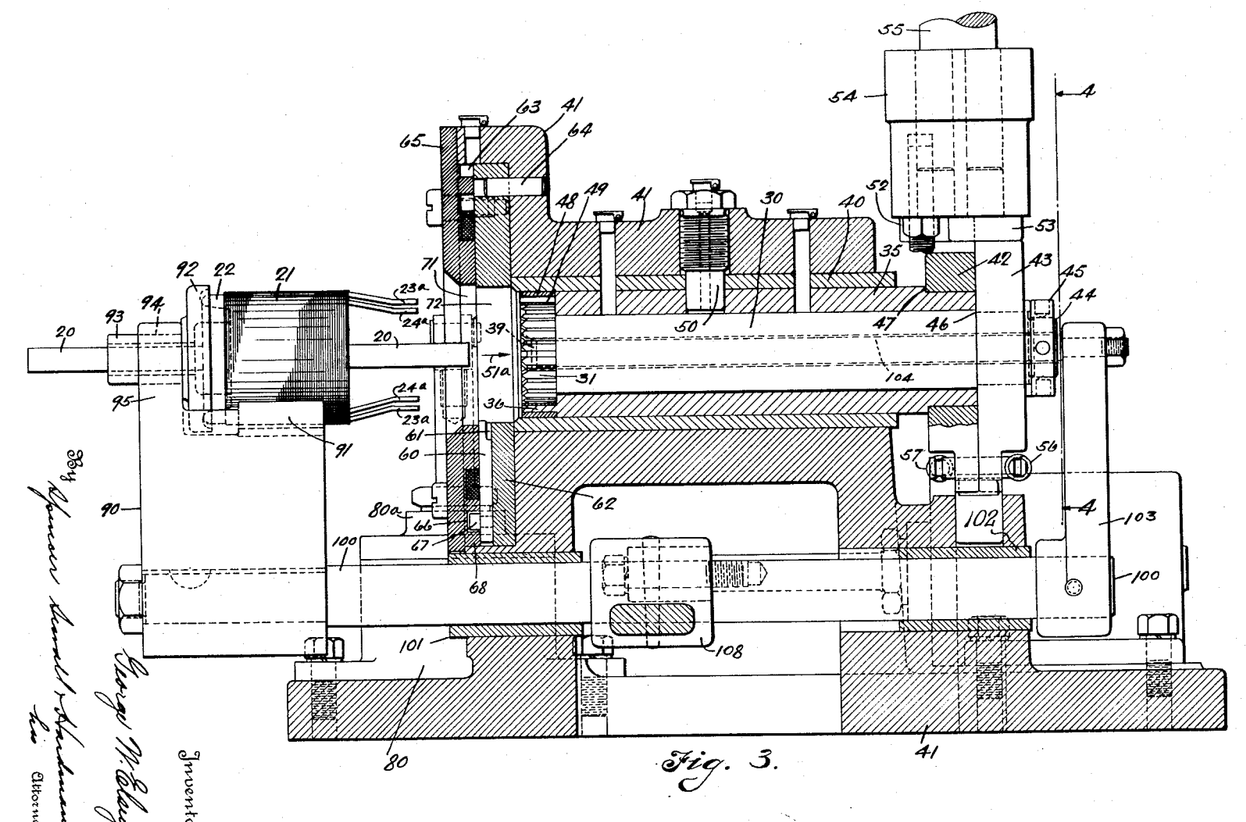
Fig. 3 is a view partly in longitudinal section of the machine, the work holder and armature being retracted from the bending members.
Figure 4:
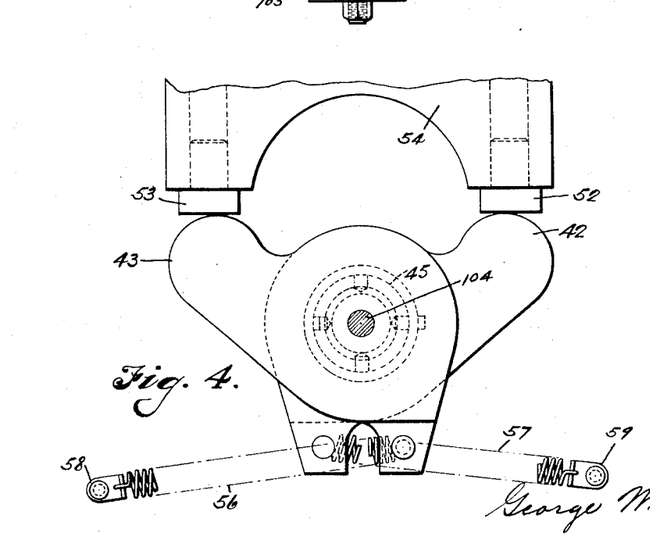
Fig. 4 is a fragmentary end view of the mechanism for operating the bending members, this view being partly in section on the line 4—4 of Fig. 3.
Figure 16:
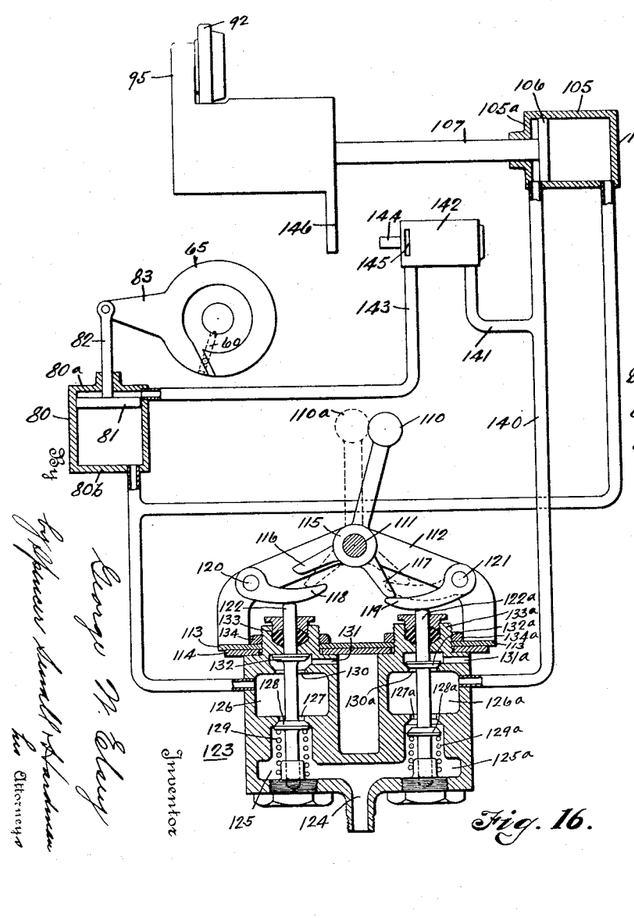
Figs. 16 and 17 are diagrammatic views showing the compressed air fluid system and control therefor for operating certain mechanisms of the machine. These figures show the control system and certain parts of the machine in two positions of operation.

The cam plate 65 is actuated by a fluid pressure device which includes a cylinder 80 shown in side elevation in Fig. 2 and diagrammatically in Fig. 16, and a piston 81 reciprocable within the cylinder and connected with the plate 65 by piston rod 82 and a lever 83 integral with said plate. When compressed air is admitted between the piston 81 and the stuffing box end 80ª of the cylinder, the piston will be moved downwardly toward the head end 80ᵇ, thereby causing the slides 60 to move inwardly from the position shown in Fig. 16 to the position shown in Fig. 17. Admission of compressed air at the head end of the cylinder will effect the opposite movement.

Work handling mechanism.

The mechanism for receiving the armature to be operated upon and for carrying it to the bending mechanism and forming devices comprises an armature support 90 providing a cradle 91 having a cylindrical surface for receiving the cylindrical armature core 21. The support 90 carries backing plate 92 which is adapted to engage the yokes of the hairpin conductors 22. The backing plate 92 is provided with a tubular shank 93 which is received by a notch 94 provided in the bracket 95 of the armature support. The tubular shank 93 receives one end of the armature shaft 20 which is located in alignment with the central bore 39 of the bending member 30. The armature support 90 is non-rotatably supported by a rod 100 which is slidable endwise through bearings 101 and 102 provided by the frame 41. A bracket 103 is non-rotatably supported by the rod 100 and supports a knock-out rod 104 slidable through the central bore 39 of the member 30. The purpose of the rod 104 is to engage the armature shaft 20 in case the armature should tend to remain in engagement with the members 30 and 35 as shown in Fig. 11. The rod 100 is actuated by a fluid pressure device which includes an air cylinder 105 within which a piston 106 reciprocates, as shown, diagrammatically in Fig. 16. The piston 106 is connected by a piston rod 107 and a yoke 108 with the rod 100. When fluid pressure is admitted between the piston 106 and the stuffing box end 105ª of the cylinder 105, the piston will be moved toward the right as viewed in Fig. 16 thus causing the work holder to be moved toward the right from the position shown in Fig. 3 to the position shown in Fig. 10. When compressed air is admitted to the head end 105ᵇ of the cylinder, the work support will be returned to position for unloading the work and re-loading.

Control mechanism.

The control mechanism for controlling the operation of the punch press which operates the bending members, and for controlling the admission of compressed air to the pressure cylinders 80 and 105, includes a single manually operated lever 110 which is connected with a shaft 111 supported by brackets 112 integral with a horizontal plate 113 which is attached in a manner to be described to a plate 114 attached to the frame 41. The shaft 111 is connected with a hub 115 from which extends fingers 116 and 117 adapted to engage respectively with levers 118 and 119 pivoted at 120 and 121, respectively. Lever 118 engages the upper end of a valve stem 122, and lever 119 engages the upper end of a valve stem 122ª. The valve body 123 provides a common air inlet passage 124 having branches 125 and 125ª which may be placed in communication with chambers 126 and 126ª by the opening of ports 127 and 127ª, respectively. These ports are normally closed by valves 128 and 128ª which are maintained on their seats by springs 129 and 129ª, respectively. The chambers 126 and 126ª are normally placed in communication by ports 130 and 130ª with exhaust ports 131 and 131ª, respectively. The ports 130 and 130ª may be closed by valves 132 and 132ª, respectively. The valve stem 122 is connected with the valves 128 and 132 and extends through a stuffing box 133 the exterior of which is threaded to receive a nut 134 by which the bracket member 113 and the plate 114 are clamped against the upper surface of the valve body 123. In this manner the valve body and bracket are secured to the base 141. Likewise the valve stem 122ª is connected with the valves 128ª and 132ª and extends through exteriorly threaded stuffing box 133ª; and a nut 134ª clamps the bracket member 113 and the plate 114 between said nut and the upper surface of the valve body 123.

"Off" position of lever 110 is indicated by the dotted line position 110ª shown in Fig. 16. To start the machine into operation after an armature has been placed upon the armature support 90, the lever 110 is moved to the position shown in full lines in Fig. 16 for the purpose of admitting air in the stuffing box ends of the cylinders 80 and 105. Movement of the lever 110 into this position will cause the finger 117 to engage the lever 119 and the latter to move the valve stem 122ª downwardly in order to close exhaust port 130ª and to open the air port 127ª. Compressed air will then flow from air inlet passage 124, through passage 125ª, port 127ª, pipe 140 to the stuffing box end of the cylinder 105; and through a branch pipe 141 through a valve 142 which is then normally closed and thus prevents the passage of compressed air from the pipe 141 into the pipe 143 which is connected with the stuffing box end of the cylinder 80. The valve 142 contains valve members and passages similar to the described parts within the valve body 123. The movement of the valve stem 144 toward the right will permit air to flow from the pipe 141 to the pipe 143, but when the valve stem 144 is in the position shown in Fig. 16, communication between the pipes 141 and 143 is interrupted. Admission of compressed air to the stuffing box end of the cylinder 105 will cause the piston 106 to move toward the right into the position shown in Fig. 17. This will cause the work carrier 90 to move from the position shown in Fig. 3 to the position shown in Fig. 10. During the movement of the carrier into this position, a part moved by rod 107, such as an arm 146 projecting from the work carrier 90, will engage the valve stem 144 and move the same into the position shown in Fig. 17, thereby connecting pipe 141 with the pipe 143 and disconnecting the pipe 143 from the exhaust passage 145. This operation of the valve 142 will cause compressed air to flow into the stuffing box end of the cylinder 80 thereby causing the piston 81 to move from the position shown in Fig. 16 to the position shown in Fig. 17 in order to move the slides 60 against the work as previously described.

Figure 12:
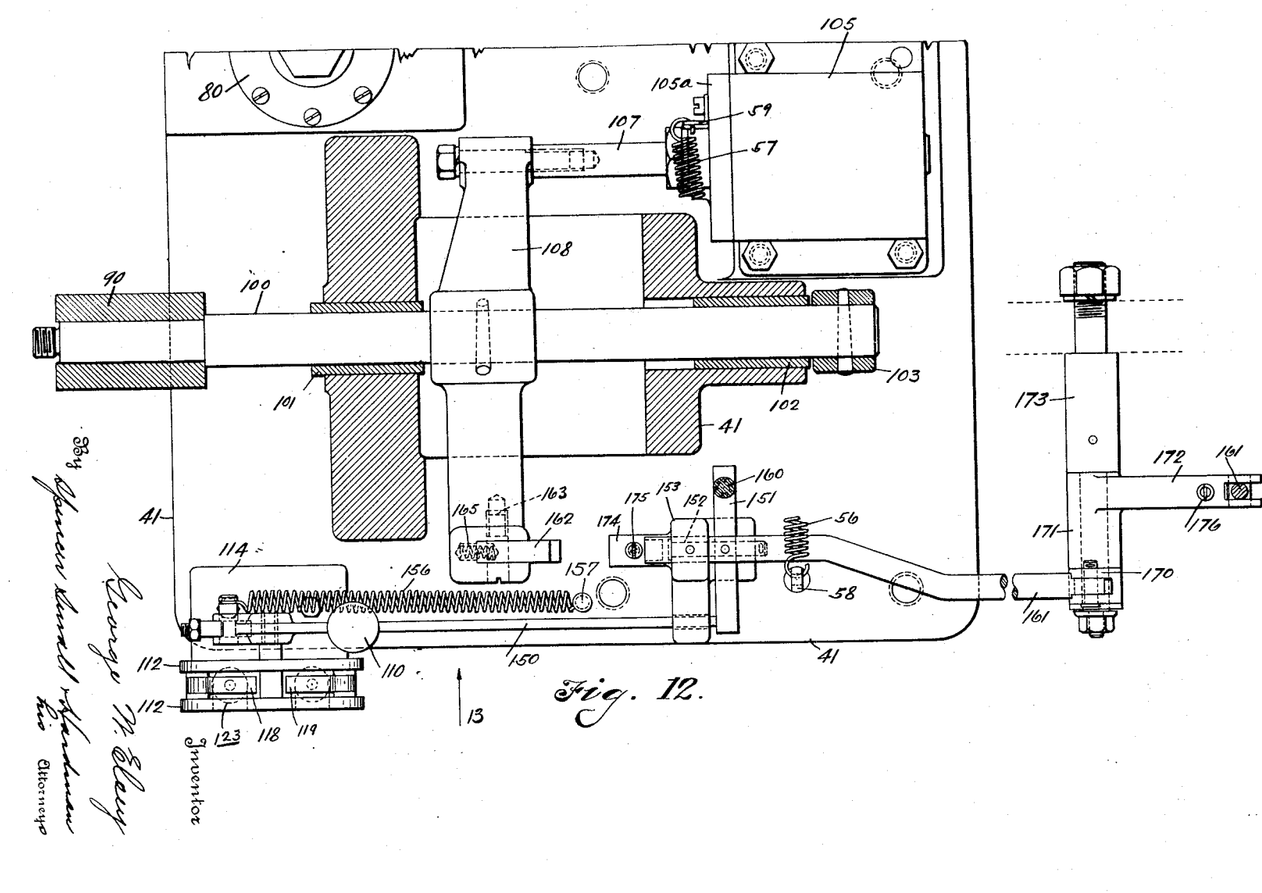
Fig. 12 is a plan view of a portion of the operating mechanism and a plan view of a portion of the control mechanism.
Figure 13:
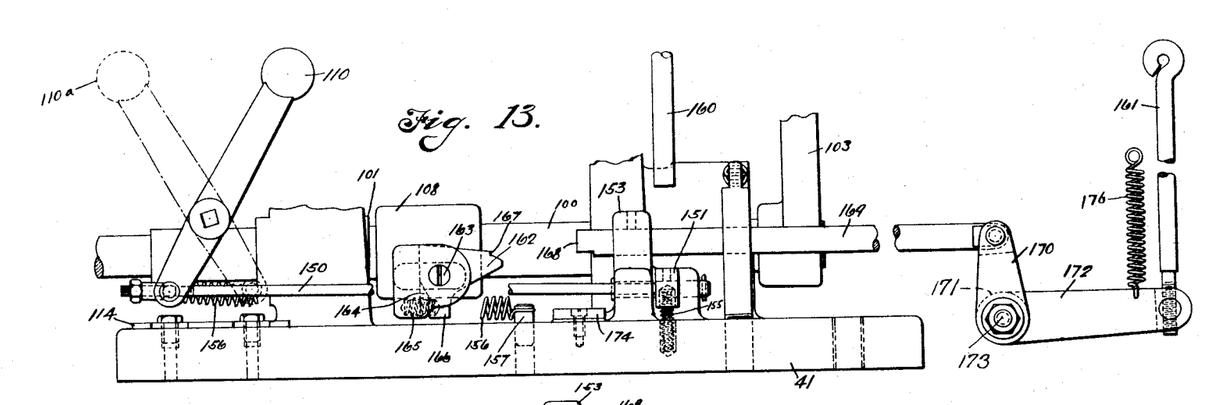
Figs. 13 and 14 are side views looking in the direction of arrow 13 of Fig. 12 of the control mechanism in Fig. 12. These views show the mechanism in two different positions of operation.

The movement of the lever 110 into the full line position, shown in Fig. 13, will cause a latch rod 150 connected with lever 110 to be moved into the position shown in Fig. 13. As the rod 150 is moved toward the left, the right hand end of the rod will move to the left of a lever 151 which is pivotally supported by a pin 152 carried by bracket 153 attached to the base 41. The end 154 of the lever is yieldingly urged into the path of movement of the rod 150 by a spring 155. Therefore as soon as the right hand end of rod 150 moves away from the lever 151, this lever will be moved into the position shown in Figs. 2 and 12 in order to prevent movement of the rod 150 toward the right, thus resisting the action of a spring 156 which is attached to a stationary stud 157 and to the lever 110. Therefore the lever 110 will be positively maintained in this position of operation until the lever 151 is moved counterclockwise as viewed in Fig. 2 to release the rod 150. The movement of the lever 151 is controlled however by the mechanism which operates the bending members so that the work carriage and clamping device must remain in the position shown in Figs. 10 and 11 until after the bending operation has been completed. The lever 151 is moved to release the rod 150 by a vertically movable rod 160 which is attached to the yoke 154. Near the end of the downward movement of the yoke 151 the rod 160 engages the lever 151 so that the bending operation is completed by the time the lever 151 has been moved into the position for releasing the rod 150.

Figures 14, 15:
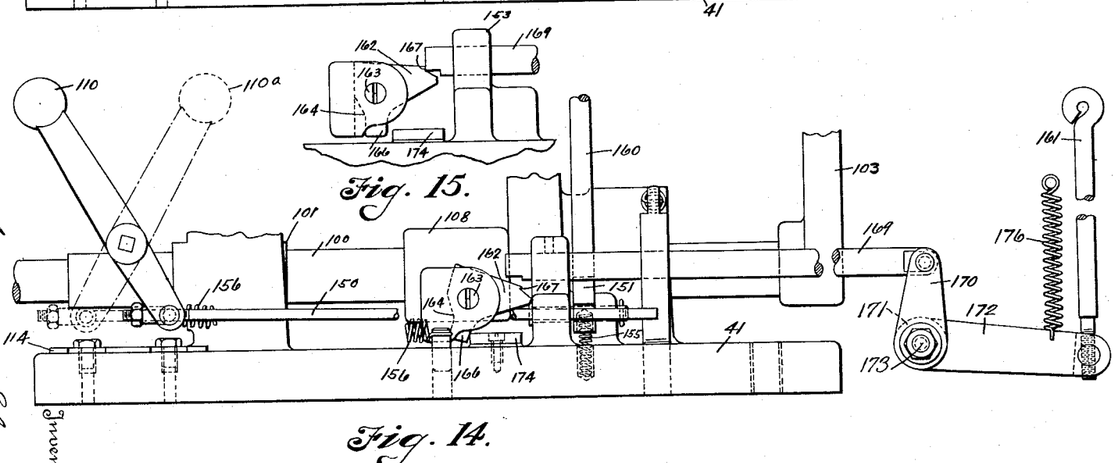
Fig. 15 is a fragmentary view showing a portion of the control mechanism in position of operation intermediate the positions shown in Figs. 13 and 14.

The downward movement of the punch press head which causes the downward movement of the member 154 and rod 160, is effected through the control of the conventional type of punch press clutch which is known as the sliding pin type. As the construction of a sliding pin clutch is well known to those skilled in the art it has not been illustrated and described. It will be understood, however, that when a clutch operating rod 161 shown in Figs. 13 and 14 is moved downwardly the clutch pin will be released so as to connect the punch press shaft with a source of power. As well known, the punch press shaft includes a crank or eccentric which causes the punch press head to move downwardly and then upwardly again. If the clutch operating rod 161 is released after the punch press shaft has made a partial revolution, the clutch pin of the punch press will be withdrawn automatically near the end of one revolution of the punch press crank so that the punch press crank will come to rest in upper dead center position. In other words, downward movement of the rod 161 will start the punch press into operation; but, if this rod is released before the end of the cycle of punch press operation, then the cycle will not be repeated and the punch press will stop after one operation.

The rod 161 is moved downwardly automatically in response to the movement of the piston rod 107 toward the right from the position shown in Fig. 12. This motion of the piston rod causes the yoke 108 to move toward the rod and to carry with it a latch lever 162 which is pivotally supported by screw 163 attached to yoke 108. The lever 162 is received by a notch 164 provided by the yoke 108 and is maintained in the position shown in Fig. 13, by spring 165 which is located between the arm 166 of the lever 162, and that portion of the yoke which defines the notch 164 and which is located below the screw 163. The lever 162 is provided with a shoulder portion 167 which is adapted to engage the end 168 of a rod 169 which is slidable through the bracket 153 and is connected with the vertical movable rod 161 by a lever 170, a lever hub 171 and a lever 172. The lever hub is supported by a stud 173 which is carried in any convenient manner by the frame of the machine. As the lever 162 moves toward the right, the shoulder 167 will engage the rod end 168 in order to move the rod 169 toward the right and the rod 161 downwardly to trip the clutch of the punch press. Further movement of the lever 162 toward the right will cause the lever arm 166 to engage the trip plate 174 attached by screw 175 to the machine frame 41. By the time the piston rod 107 has reached its limit of travel toward the right, lever 162 will have been moved into the position shown in Fig. 14 so that the rods 169 and 161 are released and are restored automatically to the position shown in Fig. 13 by the operation of a spring 176.

As already explained, this movement of the rod 161 will cause the punch press to perform one cycle of operation and then stop. This operation of the punch press will cause the yoke 54 to move downwardly to operate the bending devices as previously described. Downward movement of the yoke 54 carries the rod 160 downwardly in order to move the lever 151 into a position to release the rod 150 and to cause the spring 156 to move the lever 110 into the position shown in full lines in Figs. 14 and 17.

Figure 17:
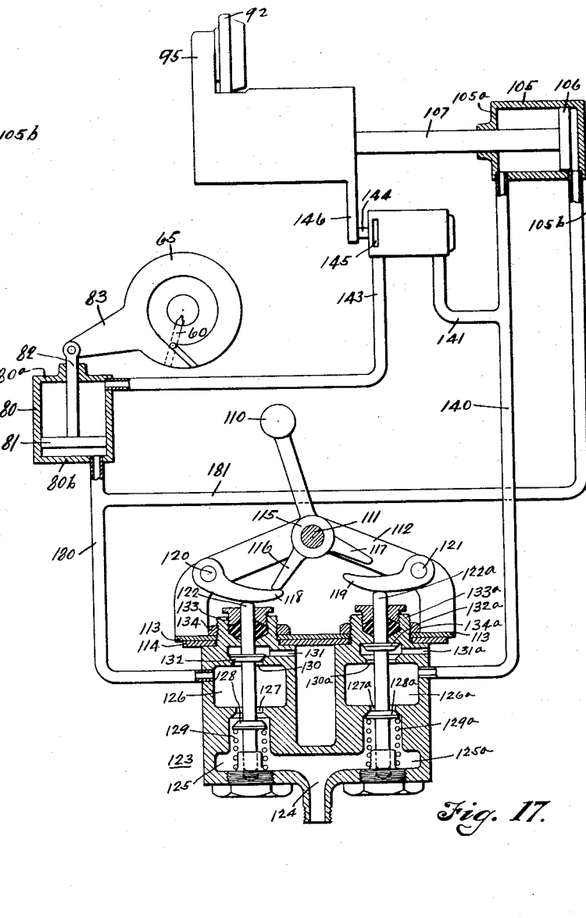

When the lever 110 is in the position shown in Fig. 17 the valve operating lever 119 is released and the operating lever 118 is pressed downwardly in order that the valve port 127 will be opened, the valve port 130 closed, the valve port 127$^a$ closed and the valve port 130$^a$ opened. This operation of the valves will cause air to flow from the air inlet passage 124 through the valve port 127, chamber 126 and thence through pipes 180 and 181 into the head ends of the cylinders 80 and 105, respectively. This will cause the piston 81 to move upwardly and the piston 106 to move toward the left in order to retract the forming devices from the work and to move the work carriage into normal position in which the armature can be conveniently removed. While the pistons are moving in the direction mentioned, air will be exhausted from the stuffing box ends of the cylinders through the pipes 143, 141 and 140 and exhaust ports 131$^a$ and 145, respectively, of the valves 123 and 142. Movement of the work carrier toward the left will retract the arm 146 from the valve stem 144 in order to restore the valve mechanism within the valve 142 to normal position whereby the port connecting the pipes 141 and 143 is closed and the port connecting the pipe 143 and the exhaust passage 145 is open.

From the foregoing description of the bending device and its mode of operation, it is apparent that the operator has only to place the work upon the work carrier 90 as shown in Fig. 13 and then release the lever 110. The work is moved automatically toward the bending members and the forming devices are applied to the work. The bending operation is performed, then the forming devices are retracted from the work and the work carrier moves the work back into the position for unloading. All these operations are carried on automatically. It is therefore apparent that the work of bending armature conductor leads has been facilitated and the cost of this part of the manufacture of bar wound armatures has been materially reduced.

While the form of embodiment of the present invention as herein disclosed constitutes a preferred form, it is to be understood that other forms might be adopted, all coming within the scope of the claims which follow.

What is claimed is as follows:

1. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, and means for advancing the carrier toward the bending mechanism, and for automatically retracting the work carrier from the bending mechanism after the bending operation, and means for operating the bending mechanism.

2. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, power means for operating the work carrier, and control means manually operated for causing the power means to advance the work carrier toward the bending mechanism, and automatically operated by the bending mechanism to cause the power means to retract the work carrier after the bending operation.

3. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, power means for operating the work carrier, power means for operating the bending mechanism, and control means manually operated for causing the carrier operating means to advance the carrier toward the bending mechanism, then causing the bending mechanism to be operated, and then causing the carrier operating means to retract the carrier.

4. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, power means for operating the bending mechanism, means for moving the work carrier toward the bending mechanism, and control mechanism for automatically causing the bending mechanism to operate after the work carrier has been advanced.

5. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, power means for operating the work carrier, power means for operating the bending mechanism, and control mechanism for automatically causing the bending mechanism to operate after the work carrier has been advanced and for causing the work carrier to be retracted after the bending operation.

6. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing the work carrier toward the bending mechanism, means for advancing said devices toward said conductors automatically in response to movement of the work carrier, and means for operating the bending mechanism.

7. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing and retracting said devices relative to the conductors, means for retracting the work carrier from the bending mechanism automatically in response to the retraction of said devices, and means for operating the bending mechanism.

8. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing and retracting the work carrier relative to the bending mechanism, means for advancing and retracting said devices relative to the conductors, control means for causing said devices to be advanced automatically in response to the advancing of the work carrier, and the work carrier to be retracted automatically in response to the retraction of said devices, and means for operating the bending mechanism.

9. Apparatus for bending armature conductor leads comprising, in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing and retracting the work carrier relative to the bending mechanism, means for moving said devices toward the conductors, and means for effecting operation of bending mechanism automatically after movement of the work carrier toward the bending mechanism and after movement of said devices toward the conductors.

10. Apparatus for bending armature conductor leads comprising, in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for affecting operation of the bending mechanism automatical.y after movement of said devices toward the conductors.

11. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for operating the bending mechanism, means for advancing and retracting said devices relative to the conductors, means causing the devices to be retracted automatically after the bending operation, and means for retracting the work carrier.

12. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing and retracting the work carrier relative to the bending mechanism, means for operating the bending mechanism, means for advancing and retracting said devices relative to the conductors, means causing the devices to be retracted automatically and the work carrier to be retracted automatically after the bending operation.

13. Apparatus for bending armature conductor leads, comprising in combination, a work carrier for receiving an assembly of an armaturs core and conductors, the ends of which extend beyond one end of the core to provide leads, bending mechanism for receiving the leads and displacing them angularly relative to the core, devices for engaging the conductors adjacent the core, power operated apparatuses respectively for causing the work carrier to be moved relative to the bending mechanism for causing said devices to be moved relative to said conductors, and for operating the bending members, and control mechanism for said apparatuses for causing the carrier to advance toward the bending mechanism, then said devices to advance toward the conductors and then the bending members to operate.

14. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, power operated apparatuses respectively for causing the work carrier to be moved relative to the bending mechanism, for causing said devices to be moved relative to said conductors, and for operating the bending members, and control mechanism for said apparatuses for effecting the advance of the carrier toward the bending mechanism and the advance of said devices toward the conductors, and effecting the bending operation only after the advance of the carrier and said devices.

15. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, power operated apparatuses respectively for causing the work carrier to be moved relative to the bending mechanism, for causing said devices to be moved relative to said conductors, and control mechanism for said apparatuses, for effecting the advance of the carrier toward the bending mechanism and the advance of said devices toward the conductors, and effecting the bending operation only after the advance of the carrier and said devices, and then effecting the retraction of the work carrier and said devices only after the bending operation.

16. Apparatus for bending armature conductor leads, comprising in combination. a work carrier for receiving an assembly of an armature core and conductors, the ends of which extend beyond one end of the core to provide leads, bending mechanism for receiving the leads and displacing them angularly relative to the core, devices for engaging the conductors adjacent the core, power operated apparatuses respectively for causing the work carrier to be moved relative to the bending mechanism, for causing said devices to be moved relative to said conductors, and for operating the bending members, and control mechanism for said apparatuses for causing automatically, in the following sequence, the advance of the work carrier toward the bending mechanism, the advance of said devices toward the conductors, the bending operation, the retraction of said devices from the conductors, and the retraction of the work carrier from the bending mechanism.

17. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, power operated apparatuses respectively for causing the work carrier to be moved relative to the bending mechanism, and for operating the bending mechanism, and control mechanism for said apparatuses for causing automatically, in the following sequence, the advance of the work carrier toward the bending mechanism, the bending operation, and the retraction of the carrier from said mechanism.

18. Apparatus for bending armature conductor leads comprising, in combination, bending mechanism for receiving the conductor leads which emerge from an end of the armature core and for displacing them angularly relative to the core, devices for engaging the conductors adjacent the core, power operated apparatuses respectively for operating the bending mechanism and for moving said devices relative to the conductors, and control mechanism for said apparatuses for causing automatically, in the following sequence, the advance of said devices toward the bending mechanism, the bending operation, and the retraction of said devices from the conductors.

19. Apparatus for bending armature conductor leads comprising, the combination, bending mechanism for receiving the conductor leads which emerge from an end of the armature core and for displacing them angularly relative to the core, devices for engaging the conductors adjacent the core, means for moving said devices relative to the conductors, and means for operating the bending mechanism automatically in response to the advancing of said devices toward the conductors.

20. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, means for moving the carrier relative to the bending mechanism and means for operating the bending mechanism automatically in response to the advancing of the carrier toward the bending mechanism.

21. Apparatus for bending armature conductor leads comprising, in combination, a tubular frame providing a recess for receiving an assembly of a slotted core and hairpin conductors, rotatable bending members supported by the frame coaxially of said recess and having means for receiving the ends of the conductors, means for engaging the conductors adjacent the core during the bending operation and including radially movable slides guided by radial grooves in one end face of the frame, a cover plate for said grooves and slides rotatably supported by the frame and provided with camming grooves oblique to said radial grooves, and pins attached to the slides and each received by one of the grooves in the cover plate.

22. Apparatus for bending armature conductors comprising, in combination, bending mechanism for receiving the conductor leads of hairpin conductors which emerge from an end of the armature core and for bending them relative to the core, and a work support including a cradle for laterally supporting the armature core, and means attached to the cradle for longitudinally engaging the yokes of the hairpin conductors, and means for moving the cradle relative to the bending mechanism.

23. Apparatus for bending armature conductors comprising, in combination, a work carrier for receiving an assembly of armature core and hairpin conductors the ends of which extend beyond one end of the core to provide leads, bending mechanism for receiving the leads and displacing them relative to the core, a fluid pressure apparatus for moving the carrier relative to the bending mechanism, power means for operating the bending mechanism, means for controlling the fluid pressure apparatus and including valves and an operating handle and a spring normally holding the handle in position for causing the pressure apparatuses to maintain the carrier retracted from the bending mechanism, latch means released by movement of the handle into position for causing the carrier to be advanced toward the bending mechanism, said latch holding the handle in said position in opposition to said spring, means responsive to the advancing of the carrier for causing the power means to operate the bending mechanism, and means responsive to operation of the power means for tripping the latch means to release said spring in order to restore the control means to normal condition whereby the carrier will be retracted from the bending mechanism.

24. Apparatus for bending armature conductors comprising, in combination, a work support for supporting an assembly of armature and hairpin conductors, the ends of which extend beyond one end of the core to provide leads, bending mechanism for receiving the leads and displacing them relative to the core, devices engageable with the conductors adjacent the core, fluid pressure apparatus for moving said devices relative to said conductors, power means for operating the bending mechanism, means for controlling the fluid pressure apparatus and including valves and an operating handle and a spring normally holding the handle in position to cause the pressure apparatus to maintain said devices retracted from the conductors, latch means released by movement of the handle into position for causing said devices to be advanced toward the bending mechanism, said latch holding the handle in said position in opposition to said spring, means for causing the power means to operate the bending mechanism automatically after said devices have advanced, and means responsive to the operation of the power means for tripping the latch means to release said spring in order to restore the control means to normal condition whereby said devices will be retracted from the work.

25. Apparatus for bending armature conductors comprising, in combination, a work carrier for receiving an assembly of armature core and hairpin conductors, the ends of which extend beyond one end of the core to provide leads, bending mechanism for receiving the leads and displacing them relative to the core, devices engageable with the conductors adjacent the core, fluid pressure apparatuses respectively for moving the carrier relative to the bending mechanism, and for moving said devices relative to the conductors, control means including a valve and a handle movable in one direction to cause the carrier to advance toward the bending mechanism, a second valve for controlling the movements of said devices and operated automatically by the advancing of the carrier to cause the devices to advance toward the conductors, the movement of said handle in the opposite direction causing the devices and carrier to be retracted, and means for operating the bending devices.

26. Apparatus for bending armature conductors comprising, in combination, a work carrier for receiving an assembly of armature core and hairpin conductors, the ends of which extend beyond one end of the core to provide leads, bending mechanism for receiving the leads and displacing them relative to the core, devices engageable with the conductors adjacent the core, power means for operating the bending mechanism, fluid pressure apparatuses respectively for moving the carrier relative to the bending mechanism and said devices relative to the conductors, means for controlling said pressure apparatuses and including valves and an operating handle and a spring normally holding the handle in position for causing the pressure apparatuses to maintain retracted the carrier and said devices, latch means released by movement of the handle into position for causing the carrier to be advanced toward the mechanism, said latch holding the handle in said position in opposition to the spring, a second valve operated automatically by the advancing of the carrier for causing said devices to be advanced toward the conductors, means responsive to the advancing of the carrier for causing the power means to operate the bending mechanism, and means responsive to the operation of the power means for tripping the latch means to release said spring in order to restore the control means to normal condition whereby the carrier and said devices will be retracted automatically.

27. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, and means for controlling the operation of the bending mechanism, said means being rendered operative automatically to effect the operation of the bending mechanism in response to movement of the carrier toward the bending mechanism.

28. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, means for retracting the carrier from the bending mechanism, and means for controlling the operation of the carrier retracting means, said control means being rendered automatically operative in response to operation of the bending mechanism to move the carrier away from the bending mechanism after the bending operation has been completed.

29. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing said devices toward said conductors automatically in response to movement of the work carrier, toward the bending mechanism, and means for operating the bending mechanism.

30. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing said devices toward the conductors and means for operating the bending mechanism, both of said means operating automatically in response to movement of the work carrier toward the bending mechanism.

31. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing said devices toward the conductors and means for operating the bending mechanism, both of said means operating automatically in response to movement of the work carrier toward the bending mechanism, and means for retracting the work carrier, said means operating automatically in response to completion of bending operation and the retraction of said devices from the conductors.

32. Apparatus for bending armature conductor leads, comprising in combination, means for supporting an assembly of an armature core and conductors, the ends of which extend beyond one end of the core to provide leads, bending mechanism for receiving the leads and for displacing them angularly relative to the core, devices for engaging the conductors adjacent the core, means for causing the bending operation to take place automatically in response to the movement of the devices toward the conductors, and the retraction of the devices to take place automatically after the bending operation has been completed.

33. Apparatus for bending armature conductor leads, comprising in combination, means for supporting an assembly of an armature core, and conductors the ends of which extend beyond one end of the core to provide leads, bending mechanism for receiving the leads and displacing them angularly relative to the core, devices for engaging the conductors adjacent the core, and means for causing the retraction of said devices from the armature core to take place automatically after the bending operation has been completed.

34. Apparatus for bending armature conductor leads comprising, in combination, a work support for receiving an assembly of a slotted core and hairpin conductors, the ends of which emerge from one end of the core and are located in concentric circular rows, two rotatable concentric bending members having recesses for receiving, respectively, the conductor ends located in inner and outer rows, levers attached respectively to the bending members, a common reciprocatable member for engaging each of the levers and moving them each in one direction of their movement, and springs for moving the levers in the opposite direction.

35. Apparatus for bending armature conductor leads comprising, in combination, a work support for receiving an assembly of a slotted core and hairpin conductors, the ends of which emerge from one end of the core and are located in concentric circular rows, two rotatable concentric bending members having recesses for receiving, respectively, the conductor ends located in inner and outer rows, levers attached respectively to the bending members, a common operating member for moving the levers simultaneously each in one of the directions of its movement, resilient means for moving the levers in other directions of their movement, and means for moving the bending members endwise during rotation thereof, the common operating member permitting endwise movement of the bending members during rotation thereof.

36. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing the work carrier toward the bending mechanism, means for advancing said devices toward said conductors, means for preventing the advancing of said devices toward the conductors until the work carrier has been advanced toward the bending mechanism, and means for operating the bending mechanism.

37. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing and retracting said devices relative to the conductors, means for advancing and retracting the work carrier relative to the bending mechanism, means for preventing the retracting of the work carrier from the bending mechanism until said conductor engaging devices have been retracted, and means for operating the bending mechanism.

38. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing and retracting the work carrier relative to the bending mechanism, means for advancing and retracting said devices relative to the conductors, means for preventing the advancing of said conductor engaging devices until after the work carrier has been advanced toward the bending mechanism and for preventing the retraction of the work carrier from the bending mechanism before said conductor engaging devices have been retracted, and means for operating the bending mechanism.

39. Apparatus for bending armature conductor leads, comprising in combination, a work carrier for receiving an assembly of an armature core and conductors, the ends of which extend beyond one end of the core to provide leads, bending mechanism for receiving the leads and displacing them angularly relative to the core, devices for engaging the conductors adjacent the core, means for advancing and retracting the work carrier relative to the bending mechanism, means for advancing and retracting said devices relative to the conductors, and means for operating the bending mechanism.

40. Apparatus for bending armature leads according to claim 39 in combination with a control mechanism having a single manually operable member through which is effected the control of the means for the advancing and retracting of the work carrier and means for advancing and retracting the conductor engaging devices.

In testimony whereof I hereto affix my signature.

GEORGE W. ELSEY.